(12) United States Patent
Novacek et al.

(10) Patent No.: US 8,225,603 B2
(45) Date of Patent: Jul. 24, 2012

(54) FLUID CONTROLLER WITH MULTIPLE FLUID METERS

(75) Inventors: William John Novacek, Bloomington, MN (US); Aaron Kelly Krahn, Plymouth, MN (US)

(73) Assignee: Eaton Corporation, Cleveland, OH (US)

( * ) Notice: Subject to any disclaimer, the term of this patent is extended or adjusted under 35 U.S.C. 154(b) by 831 days.

(21) Appl. No.: 12/363,845

(22) Filed: Feb. 2, 2009

(65) Prior Publication Data

US 2009/0199915 A1  Aug. 13, 2009

Related U.S. Application Data

(60) Provisional application No. 61/026,761, filed on Feb. 7, 2008.

(51) Int. Cl.
*B62D 5/097* (2006.01)
*B62D 5/32* (2006.01)

(52) U.S. Cl. ............................................. 60/385; 60/386

(58) Field of Classification Search ............ 60/384, 60/385, 386, 387, 403
See application file for complete search history.

(56) References Cited

U.S. PATENT DOCUMENTS

| | | |
|---|---|---|
| 4,109,679 A | 8/1978 | Johnson |
| 4,942,935 A | 7/1990 | Lech |
| 5,806,561 A | 9/1998 | Pedersen et al. |
| 6,016,656 A | 1/2000 | Sørensen |
| 6,068,460 A | 5/2000 | Haarstad et al. |
| 6,099,280 A | 8/2000 | Bernstrom |
| 6,484,840 B1 | 11/2002 | Sevelsted |
| 6,544,018 B2 | 4/2003 | Heckel et al. |
| 6,679,691 B1 | 1/2004 | Barto et al. |
| 6,804,956 B2 * | 10/2004 | Pedersen et al. ................ 60/384 |
| 2003/0196432 A1 | 10/2003 | Pedersen et al. |

FOREIGN PATENT DOCUMENTS

| | | |
|---|---|---|
| DE | 99 758 A1 | 8/1973 |
| DE | 117 652 A1 | 1/1976 |
| WO | WO 01/17840 A1 | 3/2001 |

OTHER PUBLICATIONS

International Search Report and Written Opinion mailed May 15, 2009.
Eaton Char-Lynn, *Steering Catalog*, C-STOV-MC001-E1, Jul. 2006.

* cited by examiner

*Primary Examiner* — Thomas E Lazo
(74) *Attorney, Agent, or Firm* — Merchant & Gould P.C.

(57) ABSTRACT

A fluid controller includes a first fluid meter defining a first plurality of volume chambers and a second fluid meter defining a second plurality of volume chambers. A selector assembly, disposed between the first fluid meter and the second fluid meter, includes a selector plate defining a bore and a selector valve disposed in the bore. The selector valve is adapted for rotational movement between a first position and a second position and includes a first face and an oppositely disposed second face. The selector valve defines a plurality of thru-passages that extend axially through the first and second faces and that is adapted to provide fluid communication between the first and second volume chambers in the first position. The selector valve defines a groove disposed on the second face. The groove recirculates fluid from the second plurality of volume chambers when the selector valve is in the second position.

20 Claims, 9 Drawing Sheets

FLUID CONTROLLER WITH MULTIPLE FLUID METERS

CROSS-REFERENCE TO RELATED APPLICATIONS

The present application claims priority to U.S. Provisional Patent Application Ser. No. 61/026,761 entitled "Fluid Controller with Multiple Fluid Meters" and filed on Feb. 7, 2008. The above identified disclosure is hereby incorporated by reference in its entirety.

BACKGROUND

Hydraulic steering units are used in a variety of agriculture and construction type off-highway vehicles. Hydraulic steering units typically include a displacement assembly that is used to displace fluid from the steering unit in response to rotations of a steering actuator, such as a steering wheel. However, in certain applications, it is desirable for the hydraulic steering unit to provide different rates at which fluid is displaced from the steering unit for a given rotation speed of the steering actuator.

Two-speed steering units have a first mode in which all of the fluid from the steering unit is displaced by a first displacement assembly and a second mode in which the fluid from the steering unit is displaced by the first displacement assembly and a second displacement assembly. In this second mode, the amount of fluid displaced per revolution of the steering actuator is greater than in the first mode.

While two-speed steering units are currently available and prove adequate for most applications, there exists a need for a more efficient two-speed steering unit.

SUMMARY

An aspect of the present disclosure relates to a fluid controller having a first fluid meter defining a first plurality of volume chambers and a second fluid meter defining a second plurality of volume chambers that is in selective fluid communication with the first plurality of volume chambers. A selector assembly is disposed between the first fluid meter and the second fluid meter. The selector assembly includes a selector plate that defines a bore and a selector valve disposed in the bore. The selector valve is adapted for rotational movement between a first position and a second position. The selector valve includes a first face, an oppositely disposed second face and an exterior surface that extends between the first and second faces. The selector valve defines a plurality of thru-passages that extend axially through the first and second faces. The plurality of thru-passages is adapted to provide fluid communication between the first and second volume chambers when the selector valve is in the first position. The selector valve defines a groove disposed on the second face. The groove recirculates fluid from the second plurality of volume chambers when the selector valve is in the second position.

Another aspect of the present disclosure relates to a fluid controller having a housing defining an inlet port and a return port. A valve assembly is disposed in the housing. A first fluid meter defines a first plurality of volume chambers. The first plurality of volume chambers is in selective fluid communication with the valve assembly. A second fluid meter defines a second plurality of volume chambers. The second plurality of volume chambers is in selective fluid communication with the first plurality of volume chambers. A selector assembly is disposed between the first and second fluid meters. The selector assembly includes a selector plate defining a bore and a selector valve disposed in the bore of the selector plate. The selector valve is adapted for rotational movement in the bore between a first position and a second position. The selector valve includes a first face, an oppositely disposed second face and an exterior surface that extends between the first and second faces. The selector valve defines a plurality of thru-passages that extend axially through the first and second faces. The plurality of thru-passages is adapted to provide fluid communication between the first and second plurality of volume chambers in the first position. The selector valve defines a ring-shaped groove disposed on the second face. The selector valve is adapted to block fluid communication through the plurality of thru-passages and recirculate fluid from the second plurality of volume chambers in the groove in the second position.

Another aspect of the present disclosure relates to a fluid controller having a housing defining an inlet port and a return port. A valve assembly is disposed in the housing. A first fluid meter defines a first plurality of volume chambers. The first plurality of volume chambers is in selective fluid communication with the valve assembly. A second fluid meter defines a second plurality of volume chambers. The second plurality of volume chambers is in selective fluid communication with the first plurality of volume chambers. A selector assembly is disposed between the first and second fluid meters. The selector assembly includes a selector plate defining a bore, a first valve plate, a second valve plate and a selector valve disposed in the bore of the selector plate. The first valve plate is disposed between the selector plate and the first fluid meter, the first valve plate defines a first plurality of flow passages in fluid communication with the first plurality of volume chambers. The second valve plate is disposed between the selector plate and the second fluid meter. The second valve plate defines a second plurality of flow passages in fluid communication with the second plurality of volume chambers. The selector valve is adapted for rotational movement in the bore between a first position and a second position. The selector valve includes a first face, an oppositely disposed second face and an exterior surface that extends between the first and second faces. The selector valve defines a plurality of thru-passages that extend axially through the first and second faces. The plurality of thru-passages is adapted to provide fluid communication between the first and second plurality of flow passages when the selector valve is in the first position. The selector valve defines a first groove disposed on the first face and a second groove disposed on the second face. The selector valve is adapted to block fluid communication through the plurality of thru-passages and recirculate fluid from the second plurality of volume chambers in the groove in the second position.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
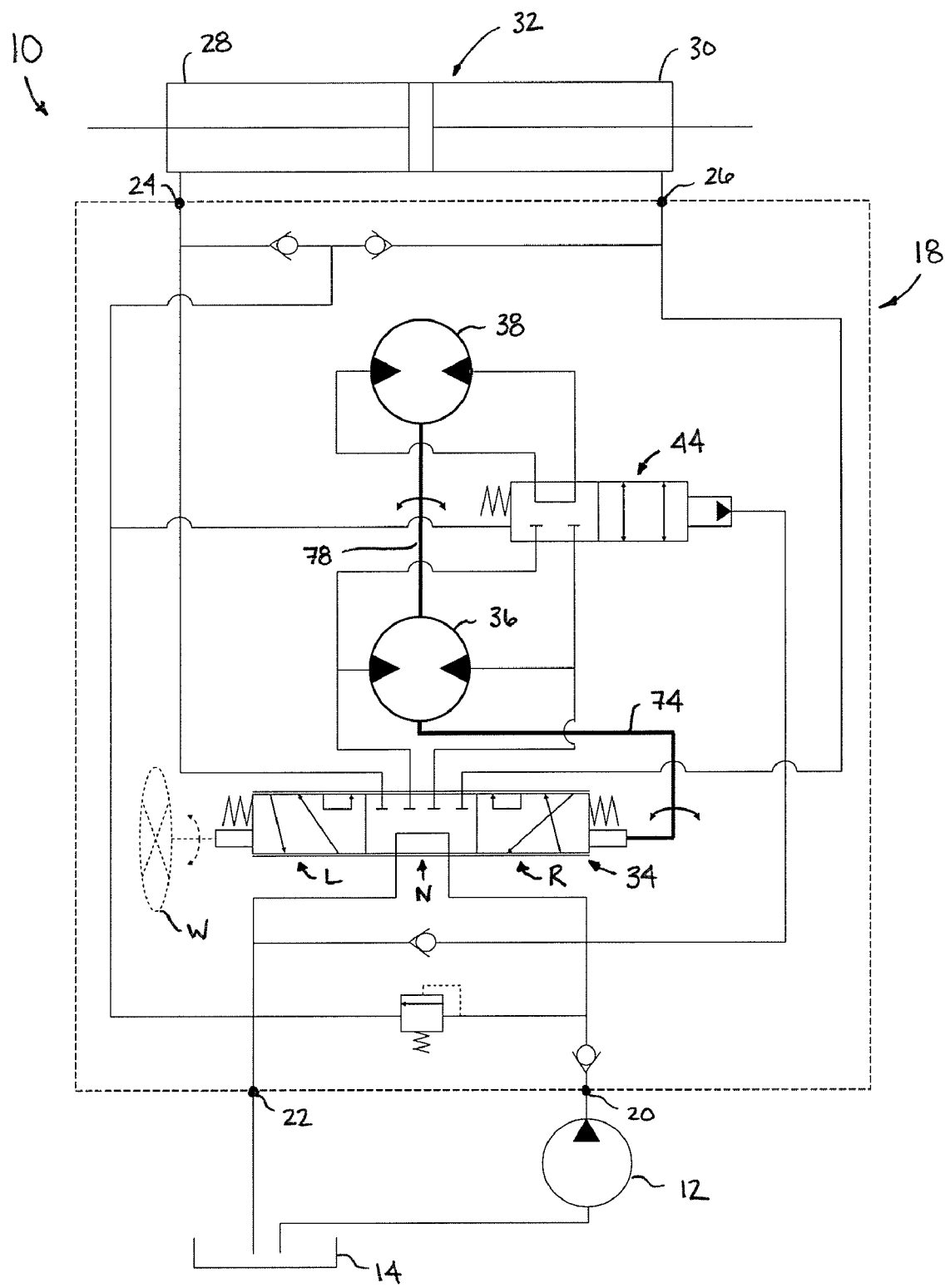
FIG. 1 is a schematic representation of a hydrostatic steering system having exemplary features that are aspects in accordance with the principles of the present disclosure.

Referring now to FIG. 1, a hydraulic schematic of a hydrostatic steering system, generally designated 10, for a vehicle is shown. The steering system 10 includes a fluid pump 12, shown herein as a fixed displacement pump, having its inlet connected to a system reservoir 14 and its outlet in fluid communication with a fluid controller, generally designated 18.

The fluid controller 18 includes an inlet port 20, a return port 22, a first control port 24 and a second control port 26. In the subject embodiment, the first and second control ports 24, 26 are in fluid communication with a first end 28 and an oppositely disposed second end 30 of a steering cylinder, generally designated 32, respectively.

The fluid controller 18 includes a valving assembly, generally designated 34. In the subject embodiment, the valving assembly 34 is movable from a neutral position N (shown in FIG. 1) to either a right turn position R or a left turn position L. When the valving assembly 34 is in either the right turn position R or the left turn position L, fluid is communicated through at least one of a first fluid meter 36 and a second fluid meter 38 to one of the first and second ends 28, 30 of the cylinder 32. One example of a valving assembly 34 that is suitable for use in the fluid controller 18 of the present disclosure is disclosed in U.S. Pat. No. 4,109,679, which is hereby incorporated by reference in its entirety. It will be understood, however, that the scope of the present disclosure is not limited to the valving assembly 34 being of the type described in U.S. Pat. No. 4,109,679.

Figure 2:
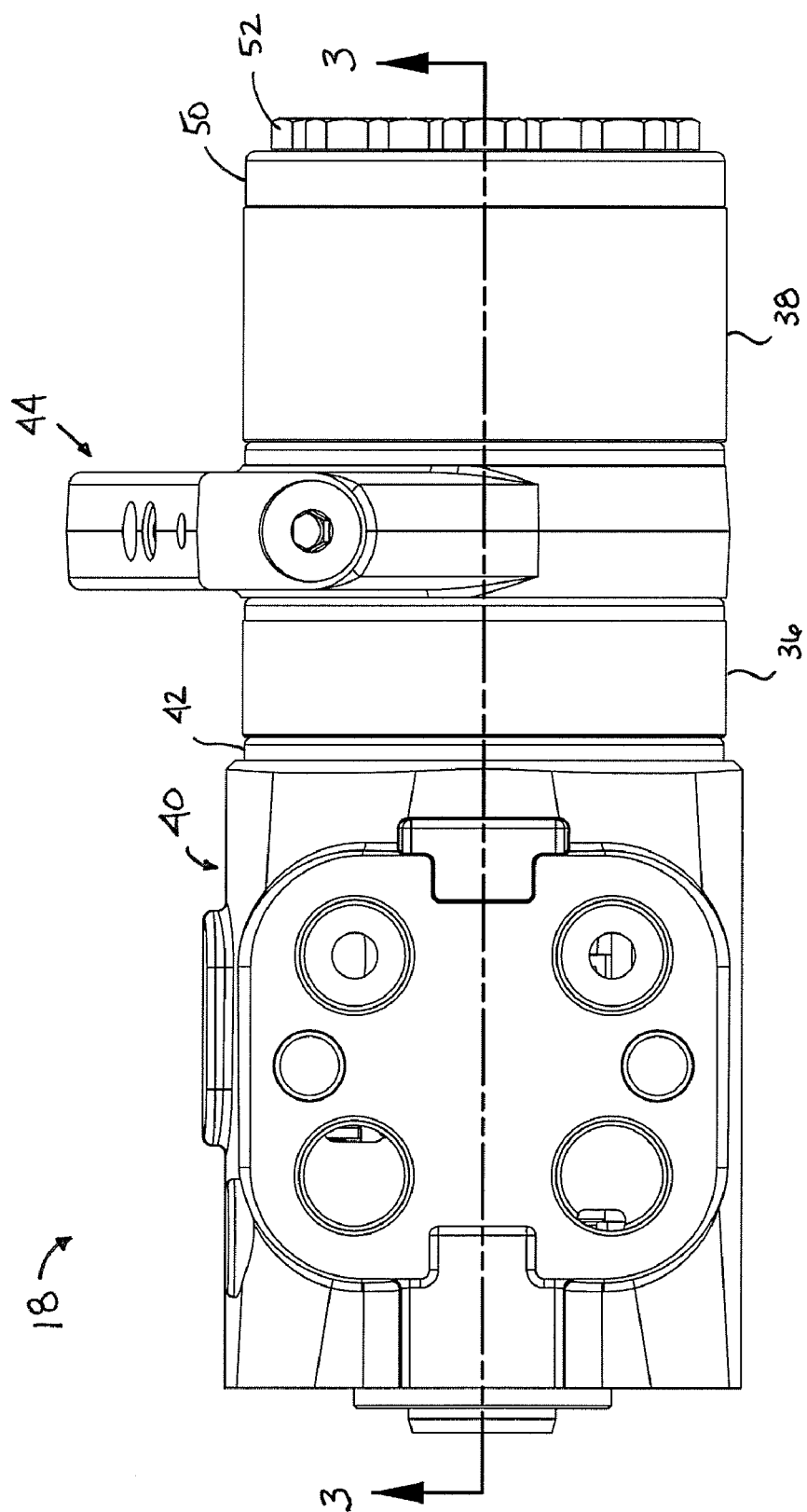
FIG. 2 is a top view of a fluid controller suitable for use in the hydrostatic steering system of FIG. 1.
Figure 3:
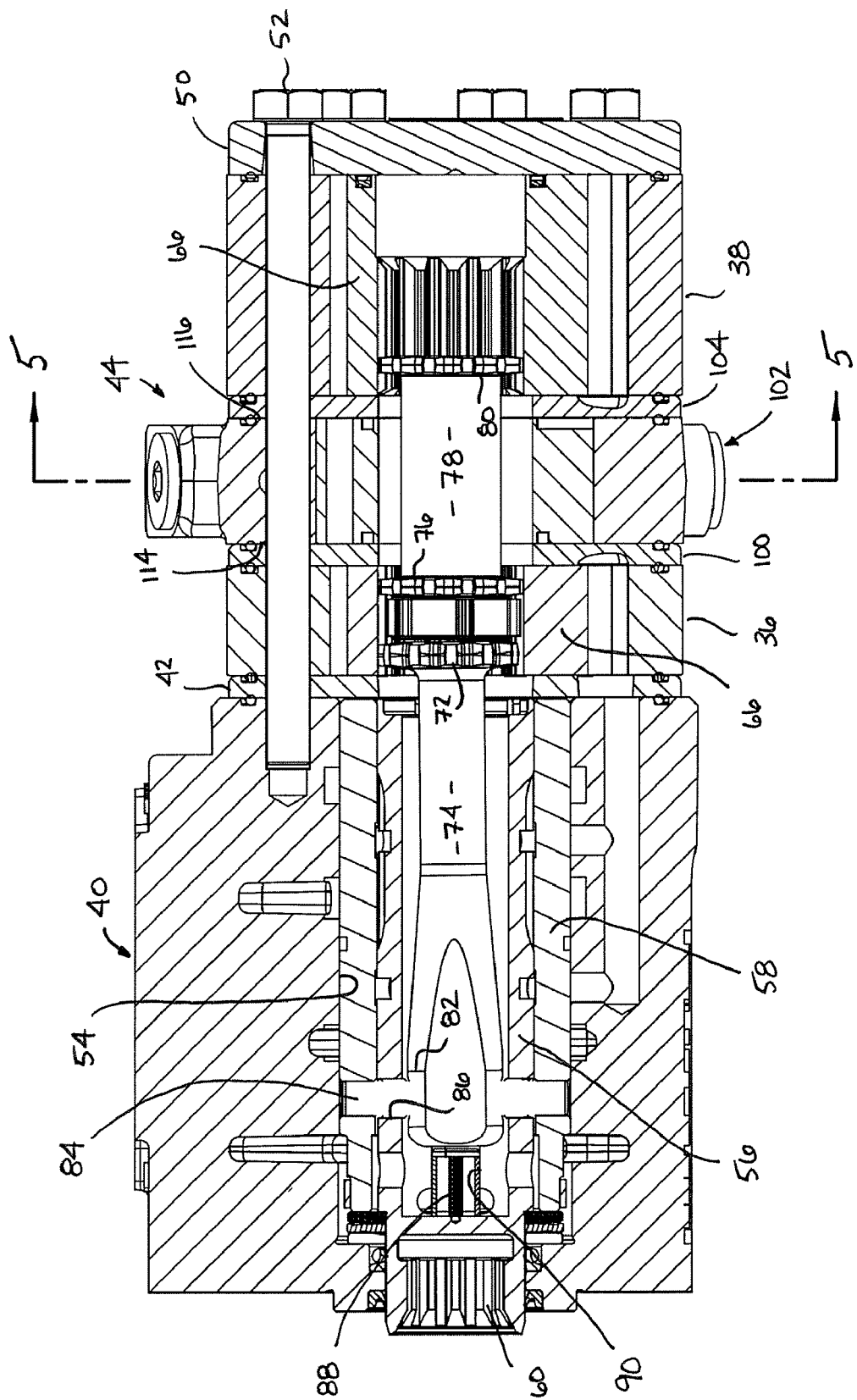
FIG. 3 is a cross-sectional view of the fluid controller of FIG. 2 taken on line 3-3 of FIG. 2.

Referring now to FIGS. 2 and 3, the fluid controller 18 includes a plurality of sections, including a housing section, generally designated 40, a first port plate 42, the first fluid meter 36, a selector assembly, generally designated 44, the second fluid meter 38, and an end cap 50. The plurality of sections are held together in tight, sealing engagement by a plurality of fasteners 52 (e.g., bolts, cap screws, etc.). In the subject embodiment, the plurality of fasteners 52 is in threaded engaged with the housing section 40.

The housing section 40 defines the inlet and outlet ports 22, 24 and the first and second control ports 26, 28. The housing section 40 further defines a valving bore 54 in which is rotatably disposed the valving assembly 34.

In the subject embodiment, the valving assembly 34 includes a rotatable valve member 56 (hereinafter referred to as the "spool") and a cooperating, relatively rotatable follow-up valve member 58 (hereinafter referred to as the "sleeve"). At a first end of the spool 56 is a portion having a reduced diameter and defining a set of internal splines 60 that provide a mechanical interface between the spool 56 and a steering wheel W (shown schematically in FIG. 1).

Figure 4:
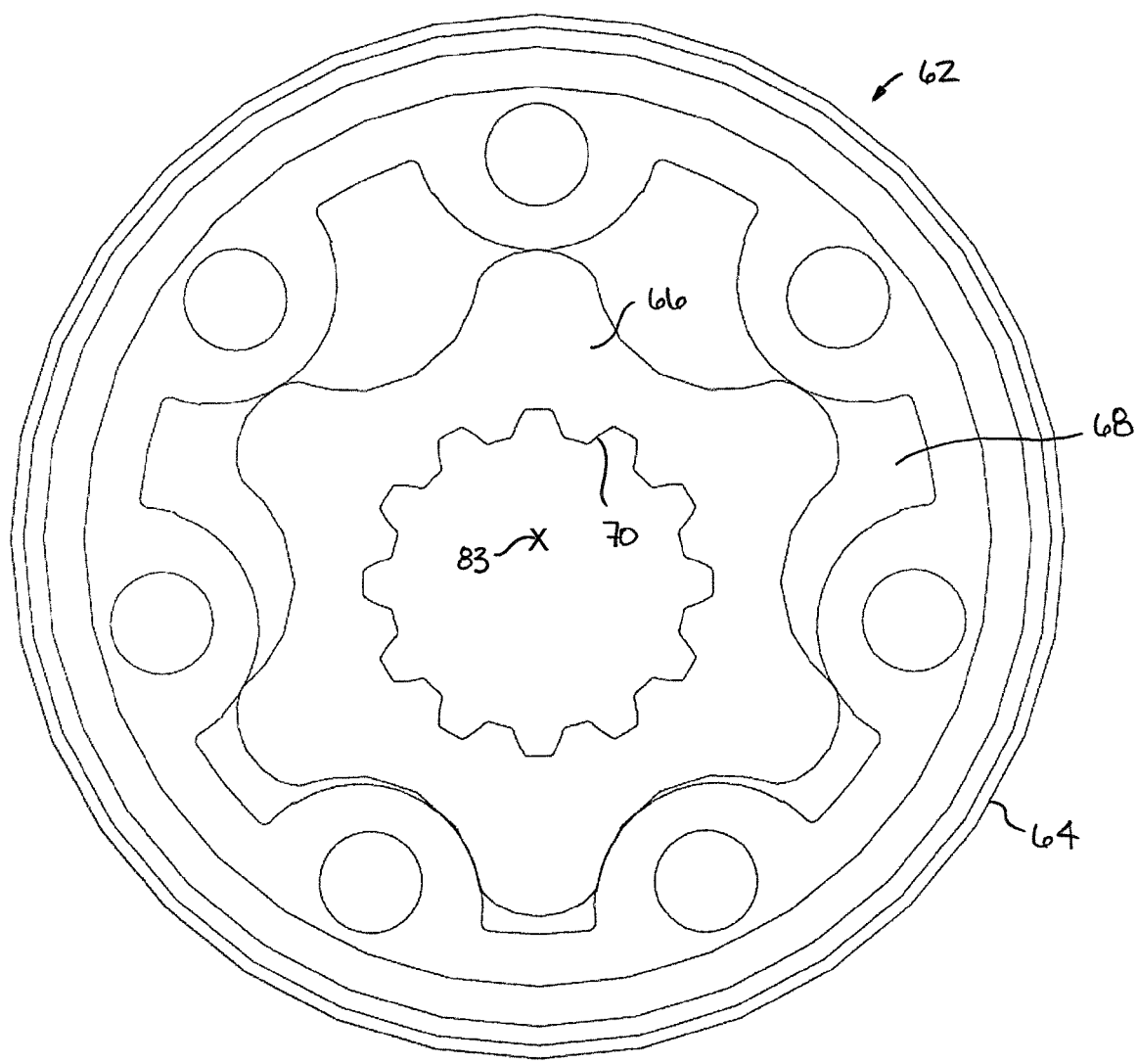
FIG. 4 is a front view of a fluid meter suitable for use in the fluid controller of FIG. 2.

Referring now to FIGS. 1, 3 and 4, each of the first and second fluid meters 36, 38 includes a gerotor gear set, generally designated 62. The gerotor gear set 62 includes an internally-toothed ring 64 and an externally toothed star 66. The internally-toothed ring 64 and the externally toothed star 66 cooperatively define a plurality of expanding and contracting volume chambers 68. The number of volume chambers 68 in each gerotor gear set 62 is equal to the number of teeth disposed externally on the star 66 plus one. In the subject embodiment, the number of volume chambers 68 defined by the first fluid meter 36 is equal to the number of volume chambers 68 defined by the second fluid meter 38.

The star 66 of each of the first and second fluid meters 36, 38 defines a set of internal splines 70. In the subject embodiment, the internal splines 70 of the first fluid meter 36 are engaged with an externally splined end 72 of a main drive 74 and a splined first end 76 of a coupling drive 78 while the internal splines 70 of the second fluid meter 38 are engaged with a splined second end 80 of the coupling drive 78. The main drive 74 mechanically couples the star 66 of the first fluid meter 36 to the sleeve 58 while the coupling drive 78 mechanically couples the star 66 of the first fluid meter 36 to the star 66 of the second fluid meter 38.

The main drive 74 includes a bifurcated end 82 that is oppositely disposed from the externally splined end 72. The bifurcated end 82 connects the main drive 74 and the sleeve 58 through a pin 84 that passes through a pair of circumferentially elongated pin openings 86 in the spool 56.

In operation, as the steering wheel W is turned, the spool 56 is rotationally displaced from the sleeve 58. This rotational displacement causes pressurized fluid to flow through the valving assembly 34 into the expanding volume chambers 68 of at least the first fluid meter 36. As the pressurized fluid enters the expanding volume chamber 68 of the at least first fluid meter 36, the star 66 orbits and rotates about a central axis 83 (shown as an "X" in FIG. 4) of the ring 64. The orbital and rotational movement of the star 66 about the central axis 83 of the ring 64 causes pressurized fluid to be expelled from the contracting volume chambers 68 of the at least first fluid meter 36 and flow through the valving assembly 34 to the cylinder 32.

The engagement between the bifurcated end 82 of the main drive 74, the pin 84, and the sleeve 58 and the orbital and rotational movement of the star 66 within the ring 64 causes the sleeve 58 to rotate within the valve bore 41 of the housing section 40. This rotation of the sleeve 58 in the valve bore 41 allows the sleeve 58 to "follow" the rotation of the spool 56, which maintains an appropriate relative rotational displacement between the spool 56 and the sleeve 58. The degree of displacement between the spool 56 and the sleeve 58 corresponds to a rate of rotation of the steering wheel W. For example, at a given rotation rate of the steering wheel W, the spool 56 is rotationally displaced from the sleeve 58 allowing fluid to flow to the cylinder 32 at a first metered rate. If the rotation rate of the steering wheel W is increased, the rotational displacement of the spool 56 and the sleeve 58 is also increased allowing fluid to flow to the cylinder 32 at a second metered rate, where the second metered rate is higher than the first metered rate.

In the subject embodiment, the fluid controller 18 further includes a plurality of leaf springs 88, which extend through spring openings 90 in the spool 56 and spring openings in the sleeve 58. The leaf springs 88 bias the sleeve 58 toward the neutral position N relative to the spool 56.

In the subject embodiment, the fluid controller 18 includes two fluid meters, the first and second fluid meters 36, 38, and the selector assembly 44. The inclusion of the first and second fluid meters 36, 38 and the selector assembly 44 allows the fluid controller 18 to communicate fluid to the cylinder 32 at different metered rates for a given rotation rate of the steering wheel W. The different metered rates for a given rotation rate of the steering wheel W affects the number of turns of the steering wheel to move the valving assembly 34 from the left position L to the right position R (i.e. lock-to-lock).

In subject embodiment, the fluid controller 18 includes a first metered mode and a second metered mode. In the first metered mode, only pressurized fluid from the contracting volume chambers 68 of the first fluid meter 36 is communicated to the cylinder 32. In the second metered mode, pressurized fluid from the contracting volume chambers 68 of both of the first and second fluid meters 36, 38 is communicated to the cylinder 32.

Figure 5:
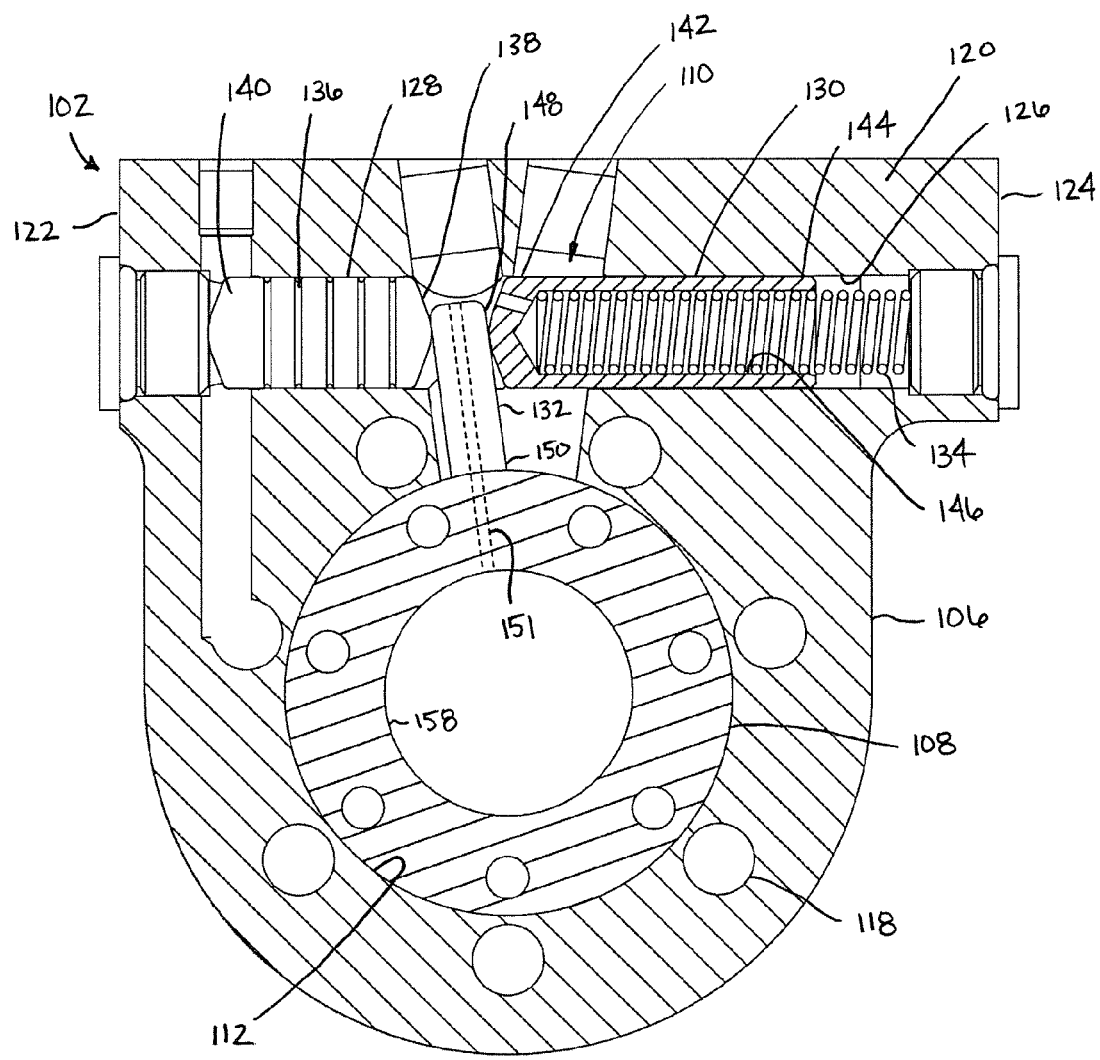
FIG. 5 is a cross-sectional view of a selector plate assembly suitable for use in the fluid controller of FIG. 2 taken generally on line 5-5 of FIG. 3.

Referring now to FIGS. 1, 3, and 5, the metered mode of the fluid controller 18 can be selectively chosen through actuation of the selector assembly 44. In the subject embodiment, the selector assembly 44 includes a first valve plate 100, a selector plate assembly, generally designated 102, and a second valve plate 104 and is disposed between the first and second fluid meters 36, 38.

The selector plate assembly 102 includes a selector plate 106, a selector valve 108, and a valve actuation assembly, generally designated 110. The selector plate 106 defines a bore 112 that is adapted for rotational engagement with the selector valve 108. In the subject embodiment, the bore 112 extends through a first surface 114 and an oppositely disposed second surface 116 of the selector plate 106. The selector plate 106 further defines a plurality of holes 118 that is adapted for receiving the fasteners 52.

In the subject embodiment, the selector plate 106 includes an end portion 120 having a first side 122 and an oppositely disposed second side 124. The end portion 120 of the selector plate 106 defines an actuation cavity 126 that is adapted for sliding engagement with the valve actuation assembly 110. In the subject embodiment, the actuation cavity 126 extends through the selector plate 106 from the first side 122 of the end portion 120 through the second side 124 of the end portion 120.

In the subject embodiment, the valve actuation assembly 110 includes an actuation piston 128, a return piston 130, an actuator 132, and a spring 134. In one embodiment, the actuation piston 128 is generally cylindrical in shape and includes a plurality of circumferential grooves 136 disposed on an exterior surface of the actuation piston 128. The circumferential grooves 136 are used for fluid balancing the actuation piston 128 in the actuation cavity 126. The actuation piston 128 includes a first end 138 and an oppositely disposed second end 140. In the subject embodiment, the first end 138 and the second end 140 are tapered.

The return piston 130 is generally cylindrical in shape and includes a first end portion 142 and an oppositely disposed second end portion 144. The second end portion 144 defines a cavity 146. In the subject embodiment, the cavity 146 is adapted to receive a portion of the spring 134.

The actuator 132 is disposed between the first end 138 of the actuation piston 128 and the first end portion 142 of the return piston 130. In the subject embodiment, the actuator 132 is generally rod shaped and includes a first axial end portion 148 and a second axial end portion 150. The second axial end portion 150 is adapted for engagement with the selector valve 108. In one embodiment, the second axial end portion 150 is in a press-fit engagement with the selector valve 108. In another embodiment, the second axial end portion 150 is in threaded engagement with the selector valve 108.

A thru-bore 151 (shown as a dashed line in FIG. 5) extends through the first and second axial end portions 148, 150 of the actuator 132 and through the selector valve 108. The thru-bore 151 provides fluid communication between the actuation cavity 126 and a center bore 158 of the selector valve 108, which is in fluid communication with the return port 22. As the center bore 158 is in fluid communication with the return port 22, the thru-bore 151 reduces pressure between the first end 138 of the actuation piston 128 and the first end portion 142 of the return piston 130 to allow the actuation assembly 110 to be selectively moveable.

Figure 6:
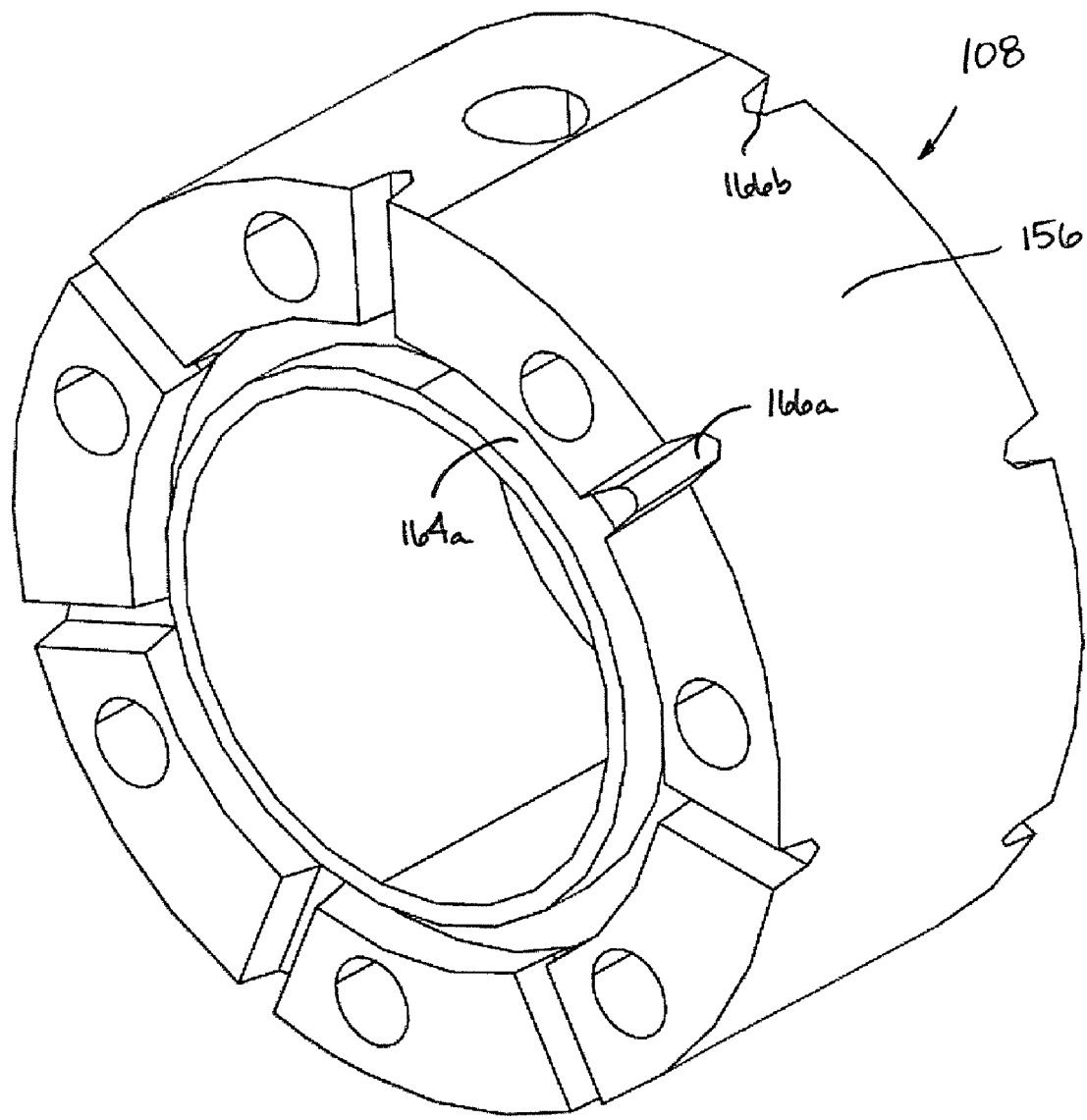
FIG. 6 is an isometric view of a selector valve suitable for use in the selector plate assembly of FIG. 5.
Figure 8:
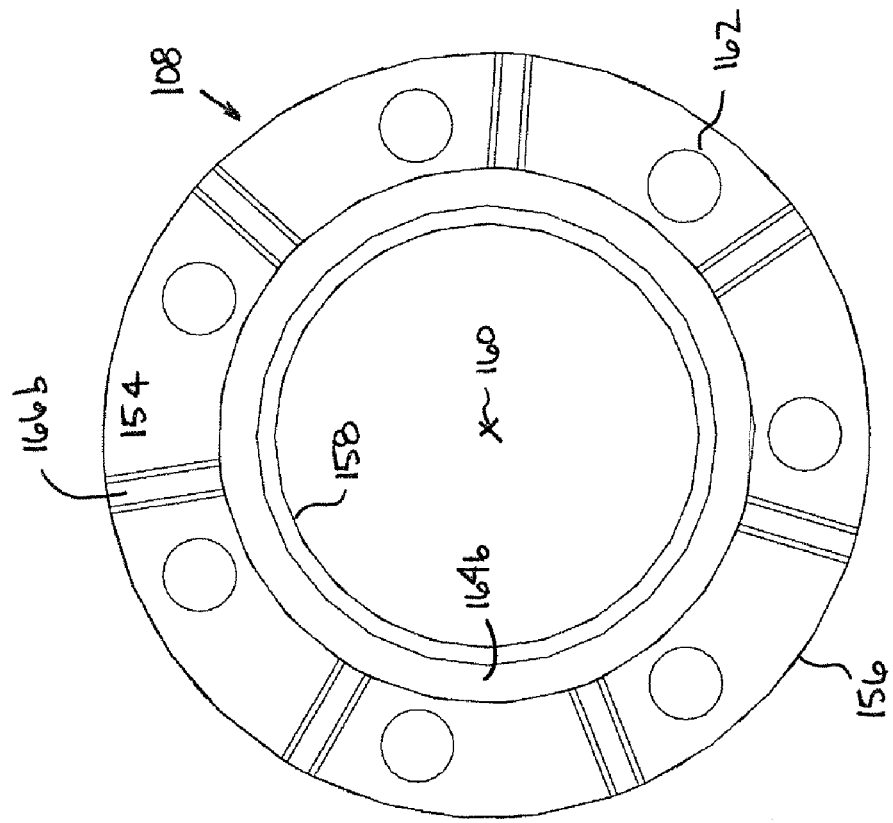
FIG. 8 is a view of a second face of the selector valve of FIG. 6.
Figure 7:
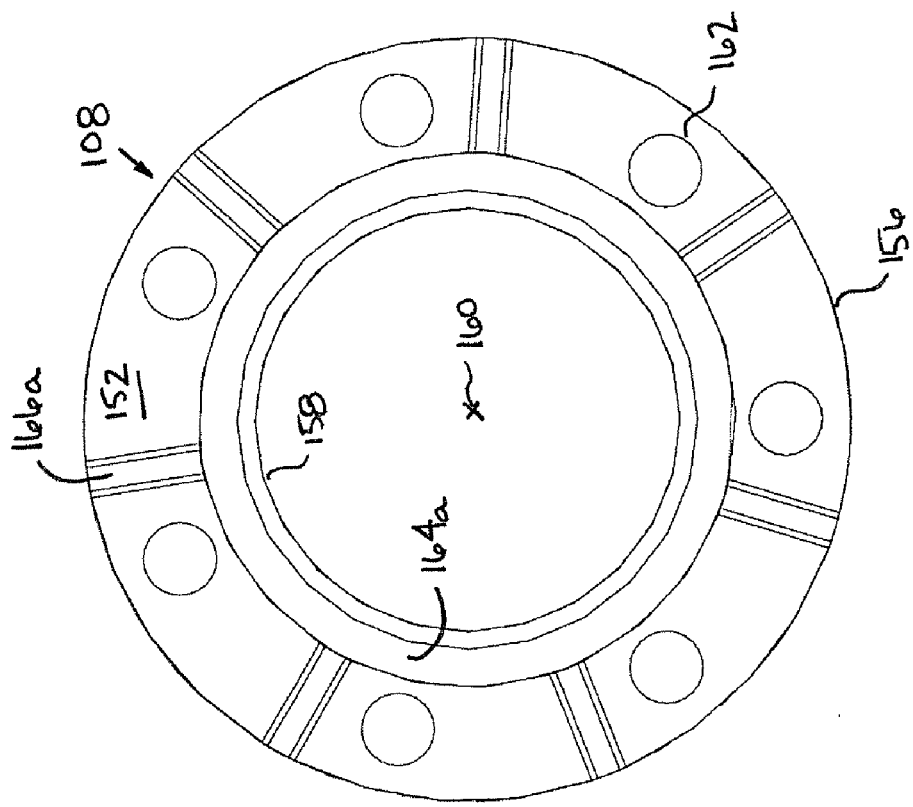
FIG. 7 is a view of a first face of the selector valve of FIG. 6.

Referring now to FIGS. 6-8, the selector valve 108 is shown. The selector valve 108 includes a first face 152, an oppositely disposed second face 154 and an exterior surface 156. In the subject embodiment, the selector valve 108 the exterior surface 156 is generally cylindrical in shape and is sized for close clearance rotational engagement with the bore 112 defined in the selector plate 106. The selector valve 108 defines a center bore 158 having a center axis 160. The center bore 158 is sized to receive the coupling drive 78 and to accommodate the orbital and rotational movement of the coupling drive 78.

The selector valve 108 defines a plurality of thru-passages 162. The thru-passages 162 are disposed about the center bore 158 and extend axial through the first and second faces 152, 154 of the selector valve 108. The number of thru-passages 162 in the selector valve 108 is equal to the number of volume chambers 68 in the first and second fluid meters 36, 38.

The selector valve 108 further defines a first groove 164a and a second groove 164b. In the subject embodiment, the first and second grooves 164a, 164b are ring shaped grooves that are disposed on the first and second faces 152, 154, respectively, of the selector valve 108. The grooves 164 are disposed between the central bore 158 and the thru-passages 162 on each of the first and second faces 152, 154.

The selector valve 108 further defines a first plurality of radial slots 166a and a second plurality of radial slots 166b. In the subject embodiment, the first and second plurality of radial slots 166a, 166b are disposed on the first and second faces 152, 154, respectively, of the selector valve 108. Each of the first and second plurality of radial slots 166a, 166b extends radially outward from the first and second grooves 164a, 164b. In the subject embodiment, the first and second plurality of radial slots 166a, 166b extends through the exterior surface 156 of the selector valve 108. Each of the first and second plurality of radial slots 166a, 166b is disposed between adjacent thru-passages 162 in the selector valve 108.

Figure 10:
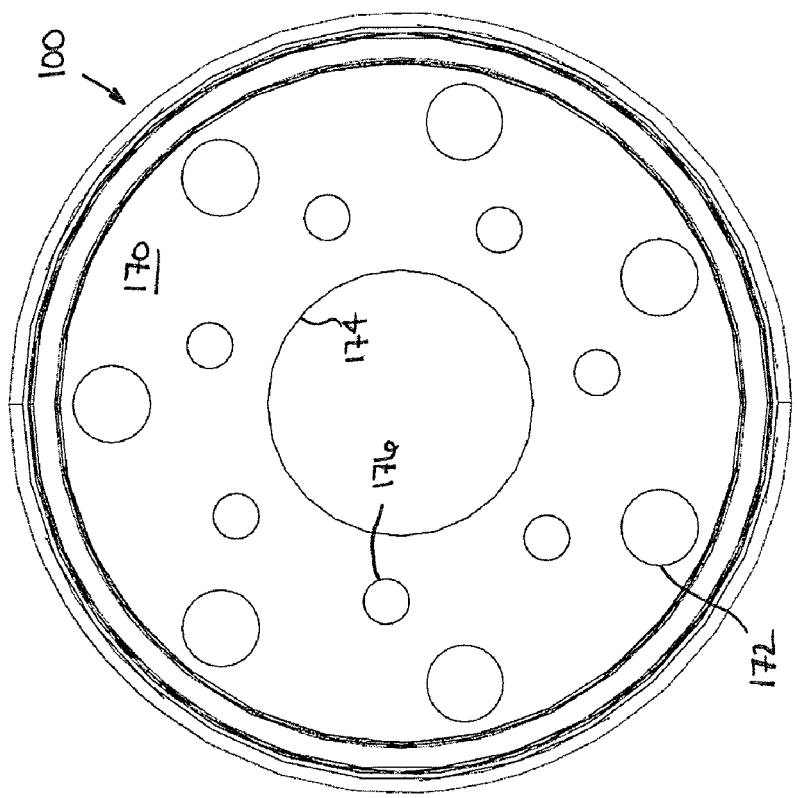
FIG. 10 is a view of a second side of the first valve plate of FIG. 9.
Figure 9:
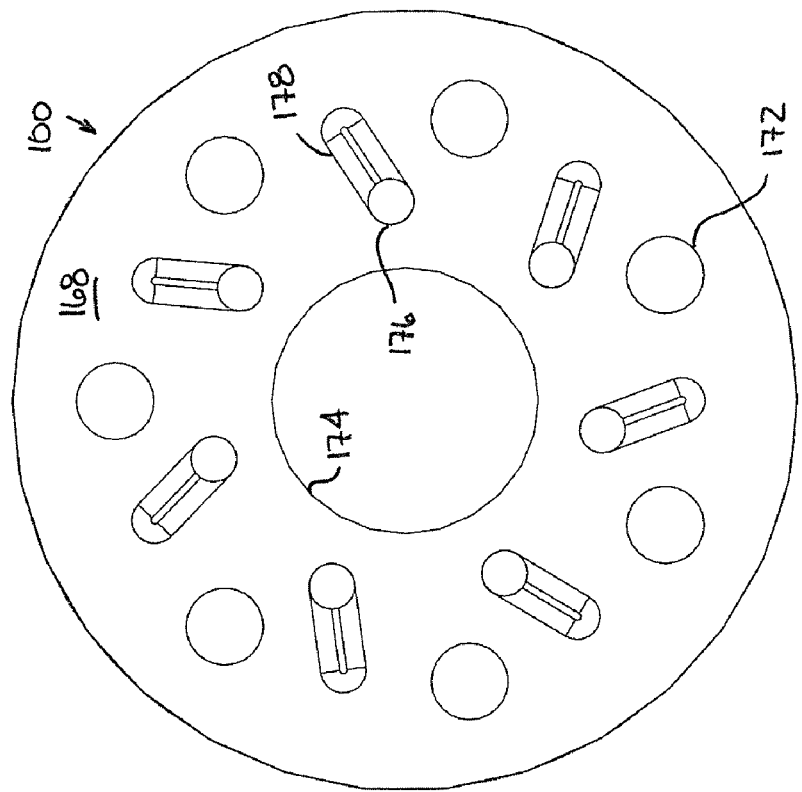
FIG. 9 is a view of a first side of a first valve plate suitable for use with a fluid controller of FIG. 2.

Referring now to FIGS. 3, 9 and 10, the first valve plate 100 is shown. In the subject embodiment, the first valve plate 100 is disposed between the first fluid meter 36 and the selector plate assembly 102. The first valve plate 100 includes a first side 168 (shown in FIG. 9) and a second side 170 (shown in FIG. 10). The first side 168 is disposed adjacent to the first fluid meter 36 and the second side 170 is disposed adjacent to the first surface 114 of the selector plate 106.

The first valve plate 100 defines a first plurality of mounting holes 172, which extends through the first and second sides 168, 170 and is adapted to receive the plurality of fasteners 52, and a thru-bore 174 that is adapted to receive and provide clearance around the main drive 74. The first valve plate 100 further defines a first plurality of flow passages 176 that extend axially through the first and second sides 168, 170. The first plurality of flow passages 176 is radially aligned with the thru-passages 162 in the selector valve 108 such that a center line passing through the centers of each of the flow passages 176 is about equal to a center line passing through the centers of each of the thru-passages 162. The number of flow passages 176 is equal to the number of volume chambers 68 in the first fluid meter 36.

The first side 168 of the first valve plate 100 defines a first plurality of slots 178 that extend outwardly from the first plurality of flow passages 176. The first plurality of slots 178 is adapted to communicate fluid from the volume chambers 68 of the first fluid meter 36 to the first plurality of flow passages 176.

Figure 12:
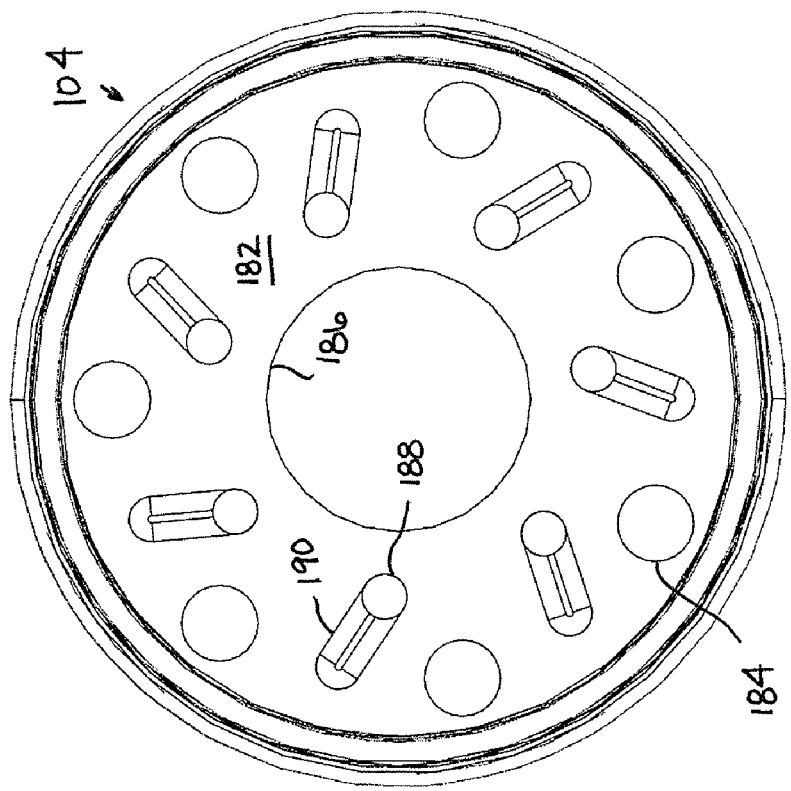
FIG. 12 is a view of a second side of the second valve plate of FIG. 11.
Figure 11:
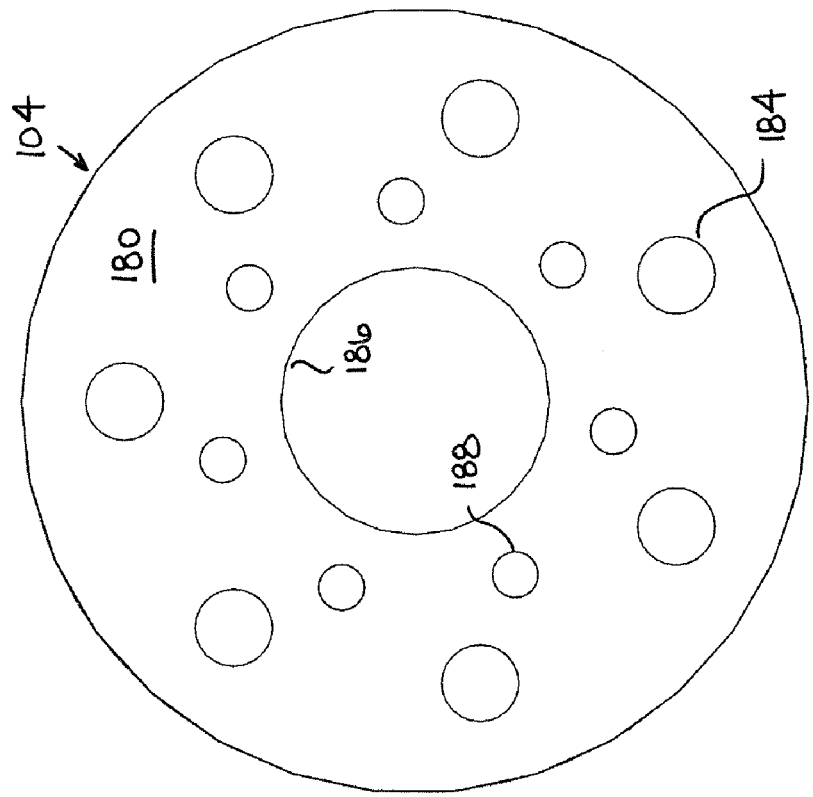
FIG. 11 is a view of a first side of a second valve plate suitable for use with the fluid controller of FIG. 2.

Referring now to FIGS. 3, 11 and 12, the second valve plate 104 is shown. In the subject embodiment, the second valve plate 104 is disposed between the selector plate assembly 102 and the second fluid meter 38. The second valve plate 104 includes a first side 180 (shown in FIG. 11) and a second side 182 (shown in FIG. 12). The first side 180 is disposed adjacent to the second surface 116 of the selector plate 106 while the second side 182 is disposed adjacent to the second fluid meter 38.

The second valve plate 104 defines a second plurality of mounting holes 184, which extends through the first and second sides 180, 182 and is adapted to receive the plurality of fasteners 52, and a main-bore 186 that is adapted to receive and provide clearance around the coupling drive 78. The second valve plate 104 further defines a second plurality of flow passages 188 that extend axially through the first and second sides 180, 182. The second plurality of flow passages 188 is radially aligned with the thru-passages 162 in the selector valve 108 such that a center line passing through the centers of each of the flow passages 188 is about equal to a center line passing through the centers of each of the thru-passages 162. The number of flow passages 188 is equal to the number of volume chambers 68 in the second fluid meter 38.

The second side 182 of the second valve plate 104 defines a second plurality of slots 190 that extend outwardly from the second plurality of flow passages 188. The second plurality of slots 190 is adapted to communicate fluid from the volume chambers 68 of the second fluid meter 38 to the second plurality of flow passages 176.

Referring now to FIGS. 3 and 5-12, the operation of the selector assembly 44 will be described. The selector valve 108 is selectively movable between a first position (shown in FIG. 5) and a second position. In the first position, the selector assembly 44 blocks fluid communication between the first and second fluid meters 36, 38. In this first position, only fluid displaced by the first fluid meter 36 is communicated to the cylinder 32. This first position provides fluid to the cylinder 32 at the first metered rate for a given rotation rate of the steering wheel W. In the second position, the selector assembly 44 allows fluid communication between the first and second fluid meters 36, 38. Therefore, in this second position, fluid displaced by both the first and second fluid meters 36, 38 is communicated to the cylinder 32. This second position provides fluid to the cylinder 32 at the second metered rate for a given rotation rate of the steering wheel W, which is greater than the first metered rate.

In certain embodiment, the selector assembly 44 is selectively movable through an action taken by an operator. For example, the operator may trigger a switch which will supply pressure to the second end 140 of the actuation piston 128 and move the selector valve 108 to the second position. In another embodiment, the selector assembly 44 is selectively movable due to the operation of the vehicle. For example, pressure may be supplied to the second end 140 of the actuation piston 128 by the pump 12 when a prime mover (e.g., an engine) is activated and thereby move the selector valve 108 to the second position. When the prime mover stalls or is shut off, the pressure at the second end 140 of the actuation piston 128 is relieved and the selector valve 108 returns to the first position. In this embodiment, the first position would be primarily for emergency steering.

As the second metered rate is greater than the first metered rate, the number of turns of the steering wheel W lock-to-lock when the selector assembly 44 is in the first position is greater than the number of turns of the steering wheel W lock-to-lock when the selector assembly 44 is in the second position.

The actuation of the selector assembly 44 will now be described. The valve actuation assembly 110 is selectively movable between a first position (shown in FIG. 5) and a second position. In the first position, the second end 140 of the actuation piston 128 abuts a first fitting 192 engaged with the actuation cavity 126 at the first side 122 of the end portion 120. The actuator 132 is held against the first end 138 of the actuation piston 128 by the spring acting on the return piston 130.

With the valve actuation assembly 110 in the first position, the selector valve 108 is in the first position. In the first position, the first plurality of flow passages 176 in the first valve plate 100 is blocked by the first face 152 of the selector valve 108. In other words, the first plurality of flow passages 176 in the first valve plate 100 is not in fluid communication with either the thru-passages 162 or the first plurality of radial slots 166a of the selector valve 108.

The second plurality of flow passages 188 in the second valve plate 104 are in fluid communication with the second plurality of radial slots 166b of the selector valve 108. The second plurality of radial slots 166b and second groove 164b communicate or recirculate fluid between each of the volume chambers 68 of the second fluid meter 38. It will be understood that the term "recirculate" as used in the specification and the appended claims is an exchange of fluid between each of the second plurality of volume chambers only and does not include fluid communication with the return port 22 of the fluid controller 18.

In operation, fluid enters the inlet of the fluid controller 18 and is communicated to the first fluid meter 36 through the valving assembly 34. Fluid from the first fluid meter 36 is then communicated to one of the first and second control ports 24, 26 through the valving assembly 34. Fluid in the volume chambers 68 of the second fluid meter 38 is communicated or recirculated to the other volume chambers 68 of the second fluid meter 38 through the second plurality of radial slots 166b and the second groove 164b.

The valve actuation assembly 110 is selective moved to the second position by supplying pressurized fluid to the second end 140 of the actuation piston 128. The pressurized fluid at the second end 140 of the actuation piston 128 pushes the actuation piston 128 against the first axial end 148 of the actuator 132, which pushes the return piston 130 toward the second side 124 of the end portion 120 of the selector plate 106. As the actuator 132 moves toward the second side 124, the selector valve 108 rotates in the bore 112 of the selector plate 106 to the second position. In the second position, the thru-passages 162 of the selector valve 108 align with the first and second plurality of flow passages 176, 188 of the first and second valve plates 100, 104 to communicate fluid between the first fluid meter 36 and the second fluid meter 38.

As the selector valve 108 is rotated from the first position to the second position or from the second position to the first position, the first plurality of radial slots 166a and the first groove 164a disposed on the first face 152 of the selector valve 108 axially balance the selector valve 108. This axial balancing allows the selector valve 108 to be easily rotated in the bore 112 without adverse frictional effects.

During at least one point of the rotation of the selector valve 108 from the first position to the second position or from the second position to the first position, the second plurality of flow passages 188 of the second valve plate 104 overlaps both the thru-passages 162 and the second plurality of radial slots 166b of the second face 154 of the selector valve 108. If the second plurality of radial slots 166b of the selector valve 108 did not recirculate the fluid disposed in the second plurality of volume chambers 68 of the second fluid meter 38, but rather drained the volume chambers 68 to the return port 22, the fluid controller 18 would leak fluid internally resulting in a low efficiency at high pressures and low rotation rates of the steering wheel W. However, by recirculating the fluid in the volume chambers 68 of the second fluid meter 38, the risk of internal fluid leakage is reduced, thereby resulting in a more efficient fluid controller 18.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fluid controller comprising:
   a first fluid meter having a first plurality of volume chambers;
   a second fluid meter having a second plurality of volume chambers, wherein the second plurality of volume chambers is in selective fluid communication with the first plurality of volume chambers;
   a selector assembly in selective fluid communication with the first and second fluid meters, the selector assembly having:
   a selector plate defining a bore; and
   a selector valve disposed in the bore and adapted for rotational movement between a first position and a second position, the selector valve including a first face, an oppositely disposed second face and an exterior surface that extends between the first and second faces, the selector valve defining a plurality of thru-passages that extend axially through the first and second faces, the plurality of thru-passages being adapted to provide fluid communication between the first and second plurality of volume chambers when the selector valve is in the first position, the selector valve defining a groove disposed on the second face, wherein the groove is adapted to recirculate fluid from the second plurality of volume chambers when the selector valve is in the second position.

2. A fluid controller as claimed in claim 1, wherein the second face defines a plurality of radial slots that extend radially outward from the groove through the exterior surface.

3. A fluid controller as claimed in claim 2, wherein the selector assembly includes a valve plate disposed between the selector plate and the second fluid meter, the valve plate defining a plurality of flow passages in fluid communication with the second plurality of volume chambers of the second fluid meter.

4. A fluid controller as claimed in claim 3, wherein the plurality of flow passages of the valve plate are adapted to overlap the plurality of radial slots and the plurality of thru-passages during at least one point of the rotation of the selector valve.

5. A fluid controller comprising:
   a housing defining an inlet port and a return port;
   a valve assembly disposed in the housing;
   a first fluid meter defining a first plurality of volume chambers, wherein the first plurality of volume chambers is in selective fluid communication with the valve assembly;
   a second fluid meter defining a second plurality of volume chambers, wherein the second plurality of volume chambers is in selective fluid communication with the first plurality of volume chambers;
   a selector assembly disposed between the first and second fluid meters, the selector assembly including:
   a selector plate defining a bore; and
   a selector valve disposed in the bore of the selector plate and adapted for rotational movement in the bore between a first position and a second position, the selector valve including a first face, an oppositely disposed second face and an exterior surface that extends between the first and second faces, the selector valve defining a plurality of thru-passages that extend axially through the first and second faces, the plurality of thru-passages being adapted to provide fluid communication between the first and second plurality of volume chambers in the first position, the selector valve defining a ring-shaped groove disposed on the second face, wherein the selector valve is adapted to block fluid communication through the plurality of thru-passages and recirculate fluid from the second plurality of volume chambers in the groove in the second position.

6. A fluid controller as claimed in claim 5, wherein the second face defines a plurality of radial slots that extend radially outward from the groove through the exterior surface.

7. A fluid controller as claimed in claim 6, wherein the selector assembly includes a valve plate disposed between the selector plate and the second fluid meter, the valve plate defining a plurality of flow passages in fluid communication with the second plurality of volume chambers of the second fluid meter.

8. A fluid controller as claimed in claim 7, wherein the plurality of flow passages of the valve plate are adapted to overlap the plurality of radial slots and the plurality of thru-passages during at least one point of the rotation of the selector valve.

9. A fluid controller as claimed in claim 5, wherein the selector valve defines a first groove disposed on the first face.

10. A fluid controller as claimed in claim 9, wherein the first face defines a first plurality of radial slots that extends radially outward from the first groove through the exterior surface and the second face defines a second plurality of radial slots that extends radially outward from the groove through the exterior surface.

11. A fluid controller as claimed in claim 5, wherein the selector plate defines an actuation cavity in which is disposed an actuation assembly for rotating the selector valve between the first and second positions, the actuation assembly including an actuation piston and an actuator having a first axial end portion and an oppositely disposed second axial end portion, the first axial end portion of the actuator being selectively acted against by the actuation piston, the second axial end portion being engaged with the selector valve.

12. A fluid controller as claimed in claim 11, wherein the actuator defines a thru-bore that extends through the first and second axial end portions, the thru-bore providing fluid communication between the actuation cavity and the return port of the housing.

13. A fluid controller comprising:
a housing defining an inlet port and a return port;
a valve assembly disposed in the housing;
a first fluid meter defining a first plurality of volume chambers, wherein the first plurality of volume chambers is in selective fluid communication with the valve assembly;
a second fluid meter defining a second plurality of volume chambers, wherein the second plurality of volume chambers is in selective fluid communication with the first plurality of volume chambers;
a selector assembly disposed between the first and second fluid meters, the selector assembly including:
a selector plate defining a bore;
a first valve plate disposed between the selector plate and the first fluid meter, the first valve plate defining a first plurality of flow passages in fluid communication with the first plurality of volume chambers;
a second valve plate disposed between the selector plate and the second fluid meter, the second valve plate defining a second plurality of flow passages in fluid communication with the second plurality of volume chambers;
a selector valve disposed in the bore of the selector plate and adapted for rotational movement in the bore between a first position and a second position, the selector valve including a first face, an oppositely disposed second face and an exterior surface that extends between the first and second faces, the selector valve defining a plurality of thru-passages that extend axially through the first and second faces, the plurality of thru-passages being adapted to provide fluid communication between the first and second plurality of flow passages when the selector valve is in the first position, the selector valve defining a first groove disposed on the first face and a second groove disposed on the second face, wherein the selector valve is adapted to block fluid communication through the plurality of thru-passages and recirculate fluid from the second plurality of flow passages in the second groove in the second position.

14. A fluid controller as claimed in claim 13, wherein the first face defines a first plurality of radial slots that extends radially outward from the first groove through the exterior surface and the second face defines a second plurality of radial slots that extends radially outward from the groove through the exterior surface.

15. A fluid controller as claimed in claim 14, wherein the second plurality of flow passages of the second valve plate are adapted to overlap the second plurality of radial slots and the plurality of thru-passages during at least one point of the rotation of the selector valve.

16. A fluid controller as claimed in claim 13, wherein the selector plate defines an actuation cavity in which is disposed an actuation assembly for rotating the selector valve between the first and second positions.

17. A fluid controller as claimed in claim 16, wherein the actuation assembly includes an actuation piston, a return piston and an actuator having a first axial end portion and an oppositely disposed second axial end portion that is engaged with the selector valve, the first axial end portion of the actuator being selectively acted against by the actuation piston to rotate the selector valve to the second position and by the return piston to rotate the selector valve to the first position.

18. A fluid controller as claimed in claim 17, wherein the actuation piston is actuated by fluid pressure.

19. A fluid controller as claimed in claim 17, wherein the selector valve is biased to the first position by a spring acting against the return piston.

20. A fluid controller as claimed in claim 17, wherein the actuator defines a thru-bore that extends through the first and second axial end portions, the thru-bore providing fluid communication between the actuation cavity and the return port of the housing.

* * * * *